(12) United States Patent
De Lamberterie

(10) Patent No.: US 8,764,257 B2
(45) Date of Patent: Jul. 1, 2014

(54) OPTICAL DEVICE, IN PARTICULAR FOR A MOTOR VEHICLE

(75) Inventor: Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 204 days.

(21) Appl. No.: 12/824,533

(22) Filed: Jun. 28, 2010

(65) Prior Publication Data

US 2011/0007518 A1    Jan. 13, 2011

(30) Foreign Application Priority Data

Jun. 30, 2009  (FR) ...................................... 09 54436

(51) Int. Cl.
*F21V 8/00*  (2006.01)

(52) U.S. Cl.
USPC ........... 362/511; 362/498; 362/518; 362/522; 362/228; 362/235

(58) Field of Classification Search
USPC ................................... 362/509, 511; 313/512
See application file for complete search history.

(56) References Cited

U.S. PATENT DOCUMENTS

| | | | | |
|---|---|---|---|---|
| 5,627,928 A | * | 5/1997 | Matsuura et al. ............... | 385/45 |
| 6,107,916 A | * | 8/2000 | Beck et al. ..................... | 340/468 |
| 6,871,988 B2 | * | 3/2005 | Gebauer et al. ............... | 362/511 |
| 6,945,680 B2 | * | 9/2005 | Holzmann et al. ............ | 362/509 |
| 7,252,420 B2 | * | 8/2007 | Pauty et al. ................... | 362/516 |
| 7,341,365 B2 | | 3/2008 | Basile et al. | |
| 7,494,257 B2 | * | 2/2009 | Gebauer et al. ............... | 362/511 |
| 7,600,905 B2 | * | 10/2009 | Geiger et al. ................. | 362/551 |
| 2003/0156037 A1 | * | 8/2003 | Pederson ................. | 340/815.45 |
| 2005/0152141 A1 | * | 7/2005 | Suzuki .......................... | 362/241 |
| 2005/0265044 A1 | * | 12/2005 | Chen et al. .................... | 362/558 |
| 2007/0114562 A1 | * | 5/2007 | Radkov et al. ................ | 257/103 |
| 2007/0139946 A1 | | 6/2007 | Basile et al. | |
| 2007/0290829 A1 | | 12/2007 | Geiger et al. | |
| 2009/0027911 A1 | | 1/2009 | Misawa et al. | |

FOREIGN PATENT DOCUMENTS

| | | |
|---|---|---|
| DE | 102005036018 A1 | 2/2007 |
| DE | 102005048498 A1 | 4/2007 |
| EP | 1854667 A1 | 11/2007 |
| EP | 2161494 | 10/2010 |
| FR | 2904680 A1 | 2/2008 |
| JP | 2006236588 A | 9/2006 |

\* cited by examiner

*Primary Examiner* — Sikha Roy

(74) *Attorney, Agent, or Firm* — Jacox, Meckstroth & Jenkins

(57) ABSTRACT

An optical device, in particular for a motor vehicle, such as a lighting or indicating device, this device comprising at least two light sources associated with different predetermined photometric functions and a principal light guide comprising an emergent end and arranged to guide the light generated by the light sources towards this emergent end, so that this emergent end defines a common illuminating surface for the two photometric functions.

34 Claims, 3 Drawing Sheets

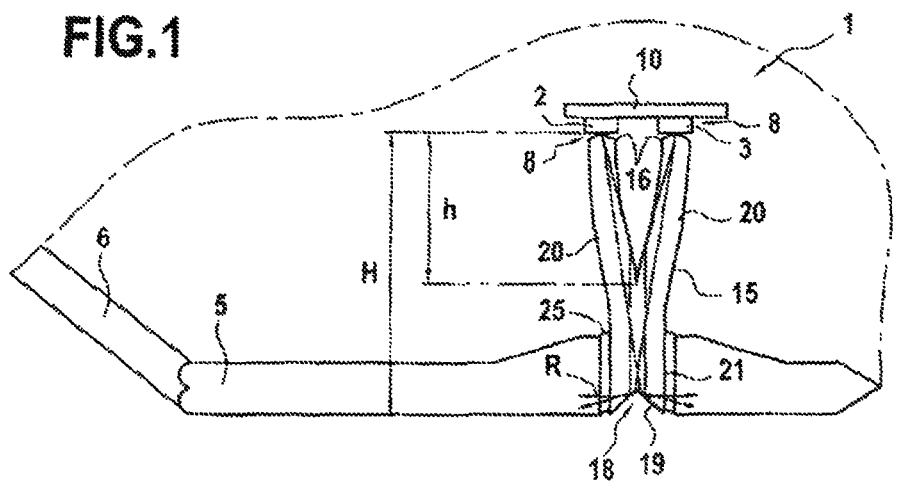
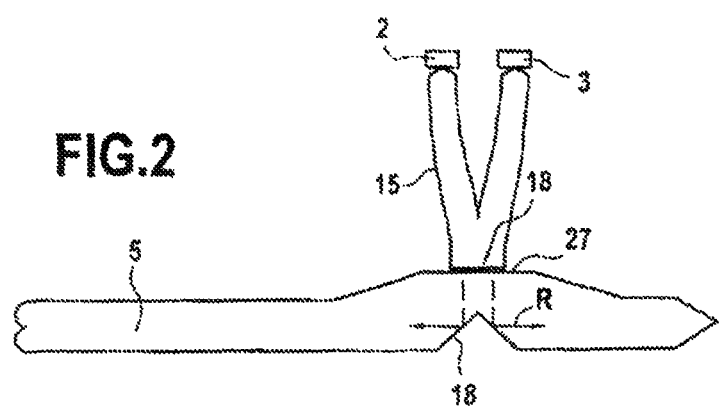
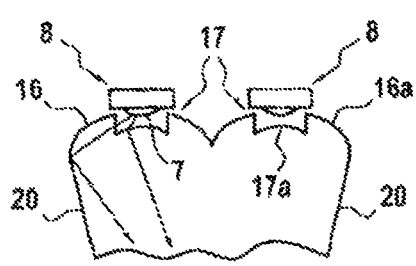
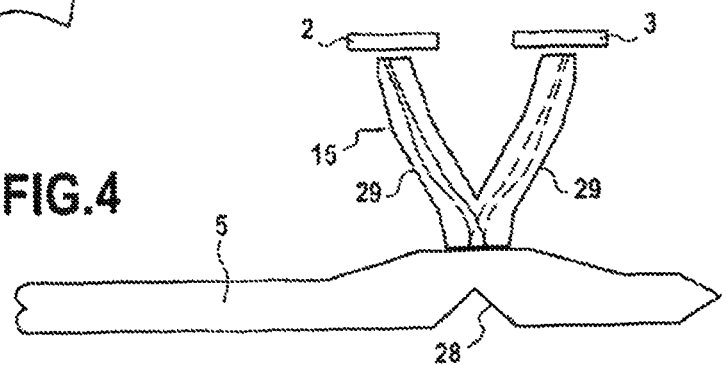

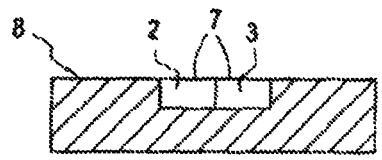
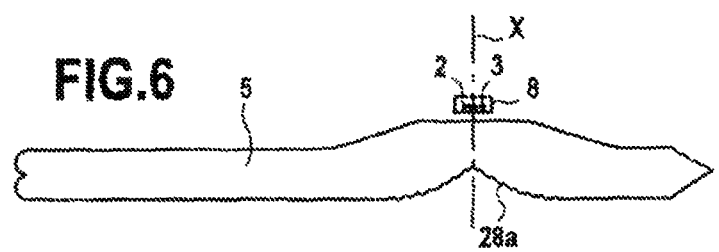
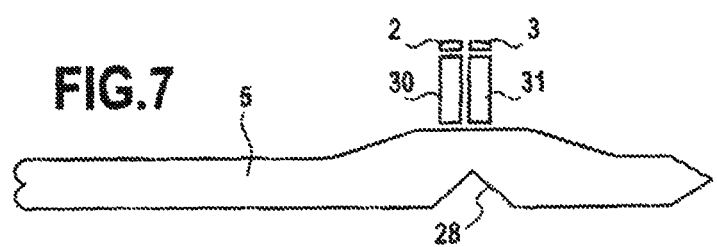
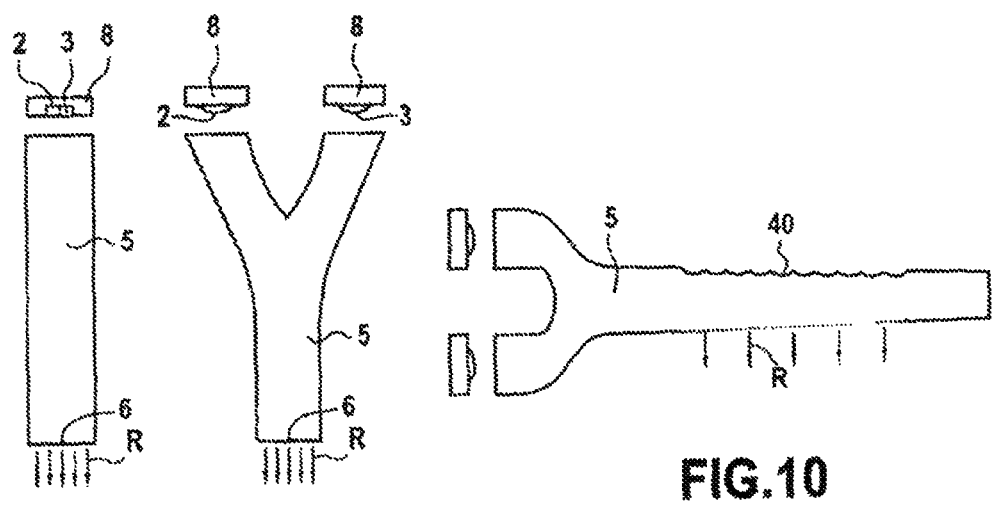

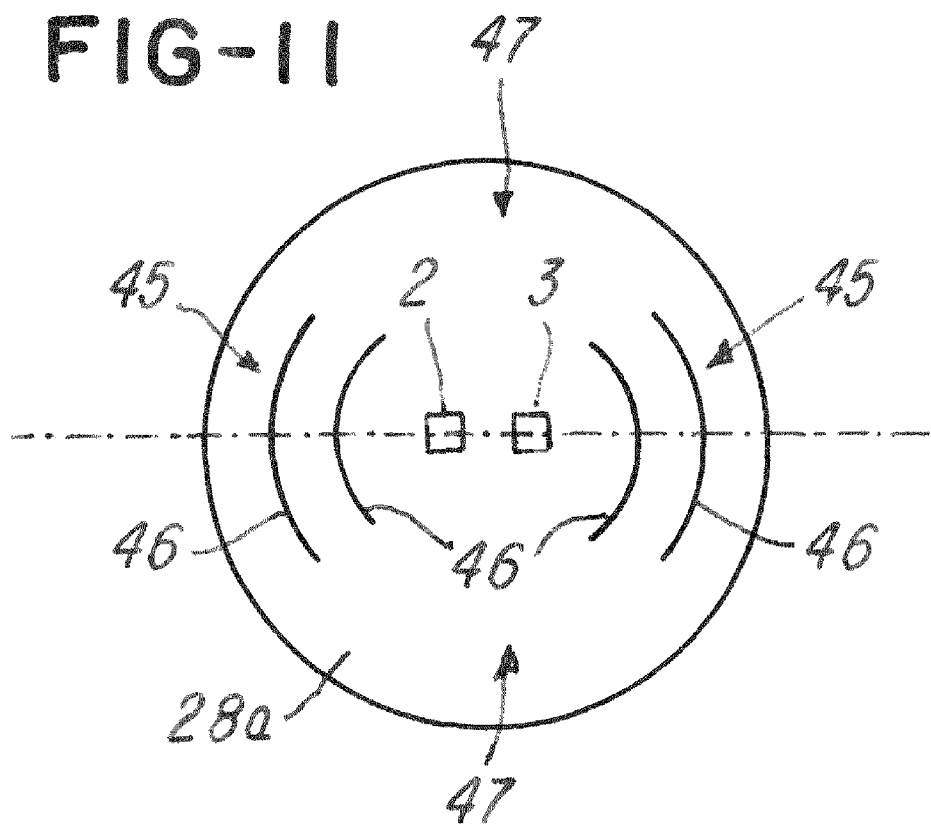

OPTICAL DEVICE, IN PARTICULAR FOR A MOTOR VEHICLE

CROSS-REFERENCE TO RELATED APPLICATIONS

This application is related to French Application No. 0954436 filed Jun. 30, 2009, which application is incorporated herein by reference and made a part hereof.

BACKGROUND OF THE INVENTION

1. Field of the Invention

The invention relates to an optical device, in particular for a motor vehicle, such as a lighting or indicating device.

2. Description of the Related Art

French patent application FR 2 904 680 discloses a motor vehicle lamp comprising three light-emitting diodes (LEDs) and a light guide in the shape of a shaft associated with these LEDs. This lamp allows only one type of photometry.

What is needed, therefore, is an improved light guide that permits a plurality of types of photometry.

SUMMARY OF THE INVENTION

The invention in particular aims at proposing a new optical device allowing two different photometric functions.

The object of the invention is thus to propose an optical device, in particular for a motor vehicle, such as a lighting or indicating device, this device comprising:
- at least two light sources associated with different predetermined photometric functions; and
- a principal light guide comprising an emergent end and arranged to guide the light generated by the light sources towards this emergent end so that this emergent end defines a common illuminating surface for the two photometric functions.

For example, one of the photometric functions corresponds to daytime light and the other photometric function corresponds to a flashing direction indicator lamp.

By virtue of the invention, it is possible to have a relatively compact and low-cost optical device which enables two different photometric functions to be associated.

In fact, common parts, for example the principal light guide, if necessary, can be used for the two photometric functions at the same time.

In addition, optical guide type technology is advantageous for associating different photometric functions insofar as the illuminated aspect and the photometry of one or other of the functions may be similar even if the placement of the sources associated with each function is different.

Advantageously, in one embodiment, the device is arranged such that, whenever one of the light sources is illuminated, the other light source is switched off so that only one of the photometric functions is activated at the same time.

Preferably, the light sources are arranged to emit light of different colours.

Preferably, the light sources are arranged to emit light of different colors. For example, one of the light sources is arranged so as to emit a white light associated with the daylight photometric function and the other light source is arranged to emit an amber colored light associated with the flashing direction indicator lamp photometric function.

In one exemplary embodiment of the invention, at least one of the light sources in particular the two light sources are each formed by a light-emitting chip of an LED.

If desirable, the light sources are formed on distinct LEDs.

The LEDs, for example, can be supported by a common bracket, this bracket comprising, for example, a flexible sheet with an electrical circuit or a printed circuit board.

By virtue of this common bracket, this enables the number of parts in the device to be reduced.

In another exemplary embodiment of the invention, the light sources are formed by light-emitting chips of the same LED.

The device can comprise an auxiliary light guide, in particular constructed as a single unit, arranged so as to guide the light from one of the light sources towards the principal light guide.

Alternatively, the light sources are directly associated with the principal light guide, without using an auxiliary light guide.

In an exemplary embodiment of the invention, the principal light guide and/or the possible auxiliary light guide comprise at least two inlets each associated with one of the light sources, so that the light from this source penetrates into the light guide through the associated inlet.

This light inlet can include a coupling area between the light source and the auxiliary light guide.

If desirable, the principal light guide and/or the possible auxiliary light guide comprise a single outlet for the light arranged to allow the emission of the light guided into this light guide.

This outlet, when it is formed on the auxiliary guide, in particular can comprise a substantially conical reflection area, for example, which reflects the light radially to create a secondary light source with an emission of radial rotation.

Alternatively, this outlet can be substantially planar in order to create a light source which emits in a particular direction.

For example, the principal light guide and/or the possible auxiliary light guide have a general Y shape, the inlets of the light each being formed on a top branch of the Y and the outlet of the light being formed at the foot of the Y.

The light guide, in particular with the Y shape, can have a substantially circular cross-section. The branches of the Y are, for example, substantially cylindrical.

Advantageously, the light inlets of the guide comprise axes which intersect near the outlet.

If necessary, the two top branches of the Y are separate from one another at a height of at least 20% of the total height of the light guide, in particular at least 50% of this total height.

Alternatively, the two branches of the Y are joined substantially over their full height.

In another exemplary embodiment of the invention, the device comprises two distinct auxiliary light guides each associated with one of the light sources.

The principal light guide and/or the possible auxiliary light guide are, for example, composed of a material enabling the light to be guided in its mass by total reflection.

The light guide, for example, is produced with a refractive index of 1.49 to 1.59, for example from material such as PMMA, PC, silicone, COO, etc.

Alternatively, the auxiliary light guide comprises at least one fiber-optic beam.

Advantageously, the principal light guide comprises an opening, in particular running all the way through, arranged to receive one end of the auxiliary light guide, so that the light being emitted by this auxiliary light guide can penetrate into the principal light guide.

Alternatively, the principal light guide comprises one in particular substantially planar, external face arranged opposite the outlet of the auxiliary light guide.

The principal light guide can be constructed as a single unit.

If desirable, the light generated by at least one of the light sources directly penetrates into the principal light guide, namely without passing through an auxiliary light guide.

Advantageously, the principal light guide comprises a reflection area, which is in particular substantially conical, in order to reflect, through the principal light guide, the light generated by the light sources or, as the case may be, by the auxiliary light guide.

The reflection area can have a shape selected so as to rectify the luminous rays generated alternatively by the light sources, so that these rays are locally parallel to the light guide.

This reflection area forms a coupling means with two focal points when the light sources are placed near the principal guide, without using an auxiliary guide.

Preferably, the principal light guide has substantially the shape of an infinitely curved surface.

In an exemplary embodiment of the invention, the principal light guide comprises a reflection area provided with corrugations, selected so as to rectify the luminous rays generated by at least one of the light sources.

For example, the principal light guide comprises uncoupling means, in particular prisms, arranged to laterally diffuse the light, in particular on a cylindrical surface of the guide.

The object of the invention is also an LED comprising two chips emitting light of different colors, in particular one of the chips emits a white light and the other emits an amber light.

These and other objects and advantages of the invention will be apparent from the following description, the accompanying drawings and the appended claims.

BRIEF DESCRIPTION OF THE ACCOMPANYING DRAWINGS

The invention will be able to be better understood upon reading the following detailed description of non-restrictive exemplary embodiments of the invention and upon examining the appended drawing, in which:

FIG. 1 illustrates, schematically and partially, an optical device according to one exemplary embodiment of the invention;

FIG. 2 represents, schematically and partially, the cross-section of an optical device according to another exemplary embodiment of the invention;

FIG. 3 illustrates, schematically and partially, an example of coupling between the light guide and the light sources in accordance with the invention;

FIGS. 4 to 10 represent, schematically and partially, other exemplary embodiments of the invention; and FIG. 11 is a schematic and partial view, along axis X, of the reflection area of the light guide in FIG. 6.

DETAILED DESCRIPTION OF THE PREFERRED EMBODIMENTS

FIG. 1 shows an optical device 1 for a motor vehicle, such as a lighting or indicating device comprising:

light sources 2 and 3 associated with different predetermined photometric functions; and a principal light guide 5 comprising an emergent end 6 and arranged to guide the light generated by the light sources 2 and 3 towards this emergent end 6 (possibly, for certain rays, after being reflected on a rear face of the light guide 5), so that this emergent end 6 defines a common illuminating surface for the two photometric functions.

This illuminating surface is that visible by people outside the vehicle.

For example, one of the photometric functions corresponds to daytime light and the other photometric function corresponds to a flashing direction indicator lamp.

The device 1 is arranged in such a way that whenever one of the light sources 2; 3 is illuminated, the other light source 2; 3 is switched off, so that the photometric functions are activated alternatively.

In the example considered, the light sources 2 and 3 are arranged to emit light of different colors.

For example, one of the light sources 2; 3 is arranged to emit a white light associated with the daylight photometric function and the other light source 2; 3 is arranged to emit an amber colored light associated with the flashing direction indicator lamp photometric function.

The light sources 2 and 3 are each formed by a light-emitting chip 7 of an LED 8 (see FIG. 3 in particular).

In the example of FIGS. 1 and 3, the light sources 2 and 3 are formed on distinct LEDs 8.

These LEDs 8 can be supported by a common bracket 10, this bracket comprising, for example, a flexible sheet with an electrical circuit or a, preferably planar, printed circuit board.

In addition, device 1 comprises an auxiliary light guide 15, constructed as a single unit and arranged so as to guide the light from the light sources 2 and 3 towards the principal light guide 5.

The auxiliary light guide 15 comprises two inlets 16, each associated with one of the light sources 2 and 3, so that the light from this source penetrates into the auxiliary light guide 15 through the associated inlet 16.

This inlet 16 comprises a coupling area 17 between the light source 2; 3 and the auxiliary light guide 15, allowing the rays generated by the source to be collimated.

This coupling area 17, for example, is formed by a cavity with a convex base 17a (see FIG. 3 in particular).

Surface 16a around the coupling area 17 has a substantially paraboloid shape.

The auxiliary light guide 15 comprises a single outlet 18 for the light arranged to allow the emission of the light guided into this auxiliary light guide 15.

This outlet 18 includes a substantially conical reflection or return area 19.

In the example described, the auxiliary light guide 15 has a general Y shape, inlets 16 of the light each being formed on a top branch 20 of the Y and outlet 18 of the light being formed at the foot 21 of the Y.

Two top branches 20 of the Y are separate from one another at a height h of at least 20% of the total height H of the light guide 15, in particular at least 50% of this total height.

Alternatively, as illustrated on FIG. 3, two branches 20 of the Y are joined substantially over their full height.

The principal light guide 5 comprises an opening 25, running all the way through, arranged to receive one end of the auxiliary light guide 15, so that the light being emitted by this auxiliary light guide 15 can penetrate into the principal light guide 5 by virtue of the substantially conical shape of the outlet 18 which allows the light rays R to be returned through the guide 5.

Alternatively, as illustrated in FIG. 2, the principal light guide 5 comprises one substantially planar external face 27, arranged opposite outlet 18, of the auxiliary light guide 15.

In this case, the principal light guide 5 comprises a substantially conically shaped reflection or return area 28 in order to radially direct the rays R into the guide 5.

In the examples which have just been described, the auxiliary light guide 15 is composed of a material enabling the light to be guided by total reflection.

Alternatively, as illustrated in FIG. 4, the auxiliary light guide 15 comprises two beams 29 comprising a number of adequately converging optical fibers, in particular so that the fibers of the two beams 29 mix in a random way so as to have uniform distribution of the flux emitted by each LED 8.

In another exemplary embodiment of the invention, as illustrated in FIG. 7, device 1 comprises two distinct auxiliary light guides 30 and 31, each associated with one of the light sources 2 and 3.

In the example of FIG. 6, the light generated by the light sources 2 and 3 directly penetrates into the principal light guide 5 along an axis X, without passing through an auxiliary light guide 15.

In the example described, the light sources 2 and 3 are formed by light-emitting chips 7 of the same LED 8.

The two chips 7 may be spaced apart from one another for example at a distance of 1 mm.

These light sources 2 and 3, as the case may be, can be illuminated separately from one another or both at the same time.

The principal light guide 5 comprises a substantially conical reflection area 28a in order to reflect, through the principal light guide 5, the light generated by the light sources 2 and 3.

This reflection area 28a (FIGS. 6 and 11) can have, in section according to an X axis plane, a generally parabolic shape for example.

In this case, the generator of the cone is a parabola instead of a straight line.

The reflection area 28a (FIGS. 6 and 11), at least locally, has a substantially corrugated form, selected so as to rectify the luminous rays generated alternatively by the light sources 2 and 3. This reflection area 28a forms a coupling means with two focal points.

For example, as illustrated in FIG. 11, the reflection area 28a can comprise two areas 45 provided with corrugations 46, these regions, for example, being alternated with two regions 47 which are devoid of these.

In the examples described, the principal light guide 5 has substantially the shape of an infinitely curved surface.

Alternatively, in the example described in FIG. 8, the principal guide 5 has a substantially cylindrical form, associated with an LED 8 having two chips 2 and 3.

In the example illustrated in FIG. 9, the principal light guide 5 has a Y shape, just like the auxiliary guide 15 described previously, associated with two LEDs 8 for each branch of the Y.

In the examples of FIGS. 8 and 9, the emergent end 6 is formed on a substantially disc-shaped surface.

Alternatively, as illustrated in FIG. 10, the principal light guide 5, with a Y shape, comprises uncoupling means 40, formed by prisms for example, arranged to laterally diffuse the light, in particular on a cylindrical surface of the light guide 5.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An optical device for a motor vehicle, such as a lighting or indicating device, said optical device comprising:

at least two light sources associated with different predetermined photometric functions, said at least two light sources comprising at least a first light source and a second light source; and a light guide comprising an emergent end and arranged to guide the light generated by said first and second light sources towards said emergent end to provide said emergent end defining a common illuminating surface for light transmitted by said at least two sources the two photometric functions;

said light guide having a first branch having an inlet face associated with said first light source and a second branch having an inlet face associated with said second light source, said inlet faces of said first and second branches being separated by a distance and being integrally formed and joined upstream of said emergent end so that light from said first light source and said second light source may be directed through said first and second branches, respectively, and exit said common illuminating surface of said emergent end of said light guide; and wherein all of said light from said first light source passes through said first branch and emerges from said common illuminating surface of said emergent end to perform a first photometric function and all of said light from said second light source passes through said second branch and emerges from said common illuminating surface of said emergent end to perform a second photometric function, said second photometric function being different from said first photometric function;

wherein light from said first light source is of a first color to perform said first photometric function and light from said second light source is of a different color than said light from said first light source to provide said second photometric function;

wherein at least one of said first or second photometric functions corresponds to a daytime light.

2. The optical device according to claim 1, wherein said at least one of the photometric functions corresponds to said daytime light and the other photometric function corresponds to a flashing direction indicator lamp, and the light sources are arranged to emit light of different colors.

3. The optical device according to claim 1, wherein one of the light sources is arranged to emit a white light associated with the daylight photometric function and the other light source is arranged to emit an amber colored light associated with the flashing direction indicator lamp photometric function.

4. The optical device according to claim 1, wherein at least one of the light sources, in particular the two light sources, are each formed by a light-emitting chip of an LED.

5. The optical device according to claim 4, wherein the light sources are formed on distinct LEDs.

6. The optical device according to claim 5, wherein the LEDs are supported by a common bracket, said common bracket comprising a flexible sheet with an electrical circuit or a printed circuit board.

7. The optical device according to claim 5, wherein the light sources are formed by light-emitting chips of the same LED.

8. The optical device according to claim 1, wherein said light guide comprises a principal light guide and an auxiliary light guide, said auxiliary light guide is constructed with said first and second branches as a single unit and is arranged so as to guide the light from one of the light sources towards the principal light guide.

9. The optical device according to claim 1, wherein the said first and second branches are integrally formed in a principal light guide, and at least two light sources are directly associated with the principal light guide.

10. The optical device according to claim 1, wherein the light guide comprises a principal light guide and an auxiliary light guide, wherein at least one of the principal light guide or an auxiliary light guide comprises at least two inlets each associated with one of the light sources, so that the light from this source penetrates into the light guide through the associated inlet.

11. The optical device according to claim 8, wherein at least one of the principal light guide or the auxiliary light guide have a general Y shape, the inlets of the light each being formed on atop branch of the Y and the outlet of the light being formed at the foot of the Y.

12. The optical device according to claim 1, wherein the light guide has substantially the shape of an infinitely curved surface.

13. The optical device according to claim 1, wherein the light guide comprises a reflection area provided with corrugations, selected so as to rectify the luminous rays generated by the light sources.

14. The optical device according to claim 1, wherein the light guide comprises uncoupling means, in particular prisms, arranged to laterally diffuse the light, in particular on a cylindrical surface of the guide.

15. The optical device according to claim 1, wherein said at least two light sources comprise LED chips that emit light of different colors.

16. The optical device according to claim 2, wherein one of the light sources is arranged to emit a white light associated with the daylight photometric function and the other light source is arranged to emit an amber colored light associated with the flashing direction indicator lamp photometric function.

17. The optical device according to claim 2, wherein at least one of the light sources, in particular the two light sources, are each formed by a light-emitting chip of an LED.

18. The optical device according to claim 2, wherein the light sources are formed on distinct LEDs.

19. The optical device according to claim 3, wherein the light sources are formed on distinct LEDs.

20. The optical device according to claim 2, wherein said light guide comprises a principal light guide and an auxiliary light guide, said auxiliary light guide is constructed with said first and second branches as a single unit and is arranged so as to guide the light from one of the light sources towards the principal light guide.

21. The optical device according to claim 3, wherein said light guide comprises a principal light guide an auxiliary light guide, said auxiliary light guide is constructed with said first and second branches as a single unit and is arranged so as to guide the light from one of the light sources towards the principal light guide.

22. The optical device according to claim 2, wherein said first and second branches are integrally formed in a principal light guide, and at least two the light sources are directly associated with the principal light guide.

23. The optical device according to claim 3, wherein the light guide comprises a principal light guide and an auxiliary light guide, wherein at least one of the principal light guide or the auxiliary light guide comprises at least two inlets each associated with one of the light sources, so that the light from this source penetrates into the light guide through the associated inlet.

24. The optical device according to claim 2, wherein the light guide comprises a principal light guide and an auxiliary light guide, wherein at least one of the principal light guide or the auxiliary light guide comprises at least two inlets each associated with one of the light sources, so that the light from this source penetrates into the light guide through the associated inlet.

25. The optical device according to claim 4, wherein the light guide comprises a principal light guide and an auxiliary light guide, wherein at least one of the principal light guide or the auxiliary light guide comprises at least two inlets each associated with one of the light sources, so that the light from this source penetrates into the light guide through the associated inlet.

26. The optical device according to claim 9, wherein the light guide comprises a principal light guide and an auxiliary light guide, wherein at least one of the principal light guide or the auxiliary light guide have a general Y shape, the inlets of the light each being formed on a top branch of the Y and the outlet of the light being formed at the foot of the Y.

27. The optical device according to claim 12, wherein the light guide comprises a reflection area provided with corrugations, selected so as to rectify the luminous rays generated by the light sources.

28. The optical device according to claim 13, wherein the light guide comprises uncoupling means, in particular prisms, arranged to laterally diffuse the light, in particular on a cylindrical surface of the guide.

29. The optical device according to claim 27, wherein the light guide comprises uncoupling means, in particular prisms, arranged to laterally diffuse the light, in particular on a cylindrical surface of the guide.

30. The optical device according to claim 1, and further comprising:
an opening in a principal light guide; and
a conical end formed on the joined branches, which fits into the opening.

31. The optical device according to claim 1, wherein said at least two light sources comprise LED chips that emit light of different colors, wherein one of said LED chips emits a white light and the other emits an amber light.

32. The optical device according to claim 8, wherein the principal light guide and the auxiliary light guide are separate.

33. The optical device according to claim 1, wherein the first and second branches are formed in a principal light guide.

34. The optical device according to claim 1, wherein the first and second branches are formed in an auxiliary light guide and said emergent end is situated adjacent a principal light guide.

* * * * *

UNITED STATES PATENT AND TRADEMARK OFFICE
CERTIFICATE OF CORRECTION

PATENT NO. : 8,764,257 B2  
APPLICATION NO. : 12/824533  
DATED : July 1, 2014  
INVENTOR(S) : De Lamberterie It is certified that error appears in the above-identified patent and that said Letters Patent is hereby corrected as shown below:

In the Specification:
Column 2, line 57, delete "COO" and insert -- COC -- therefor.

In the Claims:
Column 6, Claim 1, line 9, insert -- light -- before "source".

Column 6, Claim 6, line 57, delete "comprising" and insert -- comprises -- therefor.

Column 7, Claim 11, line 15, delete "atop" and insert -- a top -- therefor.

Column 7, Claim 21, line 51, before "an auxiliary" insert -- and --.

Signed and Sealed this  
Twenty-second Day of September, 2015

Michelle K. Lee  
*Director of the United States Patent and Trademark Office*